(12) United States Patent
Chinnadurai et al.

(10) Patent No.: US 7,751,955 B2
(45) Date of Patent: Jul. 6, 2010

(54) DIAGNOSTICS DATA COLLECTION AND ANALYSIS METHOD AND APPARATUS TO DIAGNOSE VEHICLE COMPONENT FAILURES

(75) Inventors: Manokar Chinnadurai, Owatonna, MN (US); Harry M. Gilbert, Portage, MI (US); Troy Liebl, Owatonna, MN (US); Edward Lipscomb, Lakeville, MN (US); Olav M. Underdal, Kalamazoo, MI (US)

(73) Assignee: SPX Corporation, Charlotte, NC (US)

( * ) Notice: Subject to any disclaimer, the term of this patent is extended or adjusted under 35 U.S.C. 154(b) by 569 days.

(21) Appl. No.: 11/478,339

(22) Filed: Jun. 30, 2006

(65) Prior Publication Data

US 2008/0004764 A1 Jan. 3, 2008

(51) Int. Cl.
*G06F 19/00* (2006.01)
*G06F 17/10* (2006.01)
(52) U.S. Cl. .......................................... 701/33; 701/35
(58) Field of Classification Search .................. 701/33, 701/35
See application file for complete search history.

(56) References Cited

U.S. PATENT DOCUMENTS

| | | | | |
|---|---|---|---|---|
| 5,631,831 A * | 5/1997 | Bird et al. | | 701/29 |
| 5,852,789 A * | 12/1998 | Trsar et al. | | 701/102 |
| 6,236,917 B1 | 5/2001 | Liebl et al. | | |
| 6,512,968 B1 * | 1/2003 | de Bellefeuille et al. | | 701/33 |
| 6,526,361 B1 * | 2/2003 | Jones et al. | | 702/63 |
| 6,538,472 B1 | 3/2003 | McGee | | |
| 6,560,516 B1 * | 5/2003 | Baird et al. | | 701/23 |
| 6,615,120 B1 * | 9/2003 | Rother | | 701/33 |
| 6,640,166 B2 | 10/2003 | Liebl et al. | | |
| 6,662,087 B1 | 12/2003 | Liebl et al. | | |
| 6,714,846 B2 * | 3/2004 | Trsar et al. | | 701/33 |
| 6,845,307 B2 * | 1/2005 | Rother | | 701/33 |
| 6,874,680 B1 | 4/2005 | Klaus et al. | | |
| 7,142,960 B2 * | 11/2006 | Grier et al. | | 701/29 |
| 2003/0208309 A1 * | 11/2003 | Triphathi | | 701/29 |
| 2005/0096868 A1 * | 5/2005 | Trsar et al. | | 702/182 |
| 2005/0137762 A1 * | 6/2005 | Rother | | 701/29 |

(Continued)

FOREIGN PATENT DOCUMENTS

EP 1 674 958 A1 6/2006

OTHER PUBLICATIONS

Genichi Taguchi, Subir Chowdhury, Yuin Wu. The Mahalanobis-Taguchi System. Published 2000. McGraw-Hill Professional. http://books.google.com/books?id=5AOuyyccV8kC&printsec=frontcover&sig=WdZNGINfzuveQpcYASuCMCvuiO.*

(Continued)

*Primary Examiner*—Mark Hellner
*Assistant Examiner*—Ari M Diacou
(74) *Attorney, Agent, or Firm*—Baker & Hostetler LLP

(57) ABSTRACT

A vehicle diagnostic data collector/analyzer compiles historical vehicle diagnostic data, including measured operating parameters from a number of different vehicles operating under a variety of normal vehicle operating conditions and vehicle component failure conditions, and performs statistical analyses on various vehicle type/operating condition combinations to establish operating parameter ranges corresponding to normal operating conditions and various failure conditions. The diagnostic data collector/analyzer also measures real-time operating parameters on specific test-subject vehicles and evaluates similarities and differences between the measured operating parameters and the established ranges, and correlates the test data with known operating conditions in order to diagnose potential failure modes of vehicle components.

36 Claims, 6 Drawing Sheets

U.S. PATENT DOCUMENTS

| | | |
|---|---|---|
| 2005/0177352 A1 | 8/2005 | Gravel |
| 2006/0030981 A1* | 2/2006 | Robb et al. ............... 701/29 |
| 2006/0085108 A1* | 4/2006 | Grier et al. ............... 701/29 |
| 2006/0142909 A1* | 6/2006 | Grier et al. ............... 701/29 |
| 2006/0229769 A1* | 10/2006 | Grichnik et al. ........... 701/1 |
| 2007/0213885 A1* | 9/2007 | D'Silva et al. ............ 701/1 |
| 2007/0250228 A1* | 10/2007 | Reddy et al. .............. 701/29 |
| 2007/0265743 A1* | 11/2007 | Kojitani et al. ............ 701/29 |
| 2008/0154459 A1* | 6/2008 | Grichnik et al. ........... 701/29 |

OTHER PUBLICATIONS

U.S. Appl. No. 11/452,249, filed Jun. 14, 2006, Fountain et al.

* cited by examiner

DIAGNOSTICS DATA COLLECTION AND ANALYSIS METHOD AND APPARATUS TO DIAGNOSE VEHICLE COMPONENT FAILURES

FIELD OF THE INVENTION

The present invention relates generally to diagnostic equipment. More particularly, the present invention relates to the collection and analysis of diagnostics data to diagnose operational or functional problems, such as vehicle component failures.

BACKGROUND OF THE INVENTION

Diagnostic systems are used by technicians and professionals in virtually all industries to perform basic and advanced system testing functions. For example, in the automotive, trucking, heavy equipment and aircraft industries, diagnostic test systems provide for vehicle onboard computer fault or trouble code display, interactive diagnostics, multiscope and multimeter functions, and electronic service manuals. In the medical industry, diagnostic systems provide for monitoring body functions and diagnosis of medical conditions, as well as system diagnostics to detect anomalies in the medical equipment.

In many industries, diagnostic systems play an increasingly important role in manufacturing processes, as well as in maintenance and repair throughout the lifetime of the equipment or product. Some diagnostic systems are based on personal computer technology and feature user-friendly, menu-driven diagnostic applications. These systems assist technicians and professionals at all levels in performing system diagnostics on a real-time basis.

With the advent of the microprocessor, virtually all modern vehicles have come to utilize onboard computers to control and monitor engine and electrical system functions. Such vehicle onboard computers typically interface with a multiplicity of sensors and transducers, which continuously detect vehicle and engine operational parameters and provide representative electrical signals to the onboard computer. The data collected and processed by the onboard computer can be useful in the diagnosis of vehicle engine and electrical system malfunctions. Thus, the vehicle onboard computer typically includes a communication port connector that allows certain of the collected data to be transmitted to an independent computer analyzer, which may process the data, store the data, or present the data in a visual format that can be interpreted by vehicle maintenance and repair technicians.

In conjunction with these technological developments, a variety of specialized computer analyzers, or vehicle diagnostic tools, have been developed and marketed to provide vehicle maintenance and repair technicians access to the data available from the vehicle onboard computers. The current technology includes a variety of hand-held vehicle diagnostic tools, frequently referred to as scan tools, with considerable processing capabilities, typically incorporating an integral display and capable of displaying the onboard computer data in a variety of graphical formats that allow vehicle technicians to view and interpret the data.

A typical diagnostic system includes a display on which instructions for diagnostic procedures are displayed. The system also includes a system interface that allows the operator to view real-time operational feedback and diagnostic information. Thus, the operator may view, for example, vehicle engine speed in revolutions per minute, or battery voltage during start cranking; or, with regard to the medical field, a patient's heartbeat rate or blood pressure. With such a system, a relatively inexperienced operator may perform advanced diagnostic procedures and diagnose complex operational or medical problems.

However, if an operator or technician is unable to detect an operational problem and the onboard computer has not detected a fault condition, a potential failure condition may in some cases go unnoticed. Accordingly, it is desirable to provide a method and apparatus that can be executed on diagnostic systems to collect historical operational data corresponding to normal and failure conditions, analyze the data and compare the results of the data analysis to test data gathered from a specific test subject in order to diagnose potential failure conditions that otherwise might be overlooked.

SUMMARY OF THE INVENTION

The foregoing needs are met, to a great extent, by the present invention, wherein in one aspect an apparatus and method are provided that in some embodiments provide for collecting historical operational data corresponding to normal and failure conditions, analyzing the data and comparing the results of the data analysis to test data gathered from a specific test subject in order to diagnose potential failure conditions that otherwise might be overlooked.

In accordance with one aspect of the present invention, a computer-implemented method of analyzing vehicle test data to diagnose a failure mode of a vehicle component can include compiling a collection of historical test data points each of which includes at least one operational parameter measurement of an individual vehicle, and defining a range corresponding to an operating condition of a vehicle type based on the collection of test data points.

In accordance with another aspect of the present invention, a computer program product for analyzing vehicle test data to diagnose a failure mode of a vehicle component can include a computer-readable medium encoded with instructions configured to be executed by a processor in order to perform predetermined operations including compiling a collection of historical test data points each of which includes at least one operational parameter measurement of an individual vehicle, and defining a range corresponding to an operating condition of a vehicle type based on the collection of test data points.

In accordance with yet another aspect of the present invention, a diagnostic tool for analyzing vehicle test data to diagnose a failure mode of a vehicle component can include a data compiler configured to compile a collection of historical test data points each of which includes at least one operational parameter measurement of an individual vehicle, and a data analyzer configured to define a range corresponding to an operating condition of a vehicle type based on the collection of test data points.

In accordance with yet another aspect of the present invention, a diagnostic tool for analyzing vehicle test data to diagnose a failure mode of a vehicle component can include means for compiling a collection of historical test data points each of which includes at least one operational parameter measurement of an individual vehicle, and means for defining a range corresponding to an operating condition of a vehicle type based on the collection of test data points.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
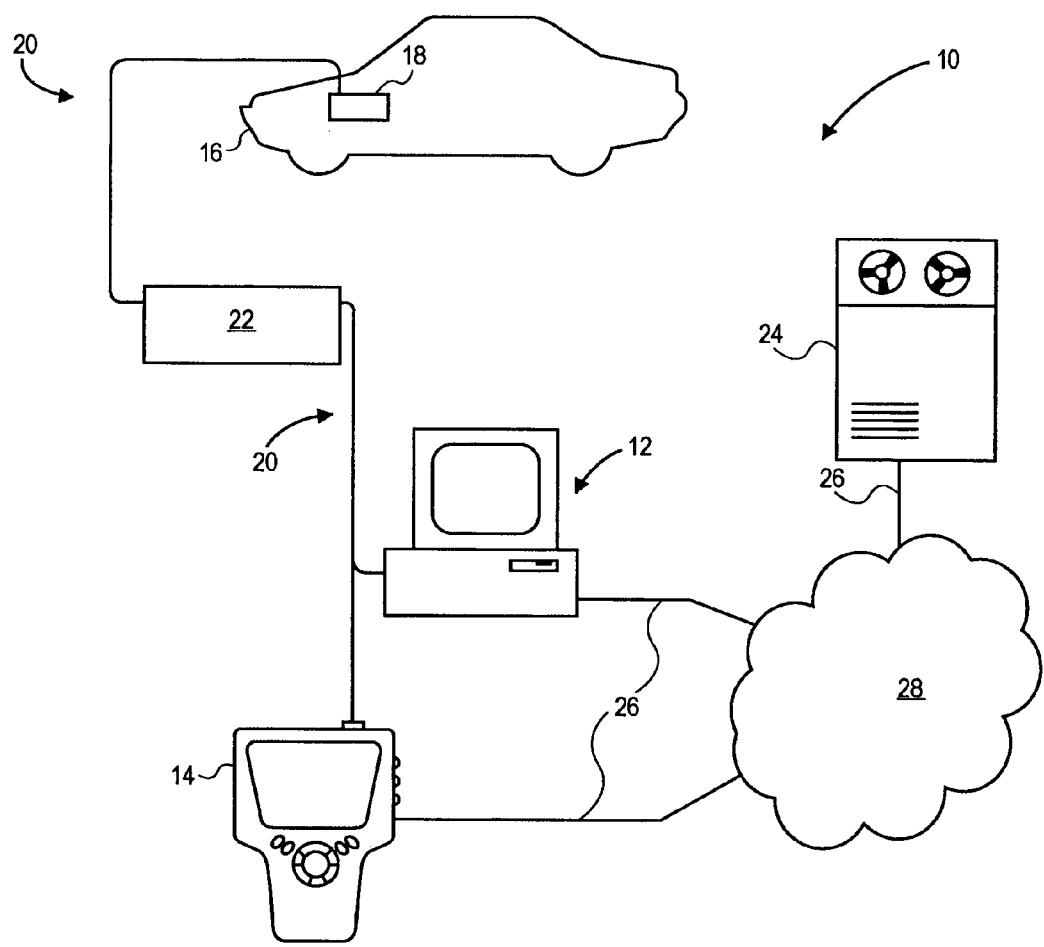
FIG. 1 illustrates a representative vehicle diagnostic data collector/analyzer according to an embodiment of the invention.

A representative embodiment in accordance with the present invention provides a vehicle diagnostic data collector/analyzer that can collect historical vehicle operational data corresponding to various normal vehicle operating conditions and vehicle component failure conditions, analyze the data and compare the results of the data analysis to test data gathered from a specific test-subject vehicle in order to diagnose potential failure conditions of vehicle components. The vehicle diagnostic data collector/analyzer can be useful in diagnosing failure conditions that otherwise might be overlooked.

For example, an operator or technician may in some cases be unable to directly detect a potential failure condition based on a vehicle onboard computer trouble code or codes, or a vehicle operational symptom or symptoms, even though a potential failure condition exists. Nonetheless, in such a case the vehicle diagnostic data collector/analyzer may be able to monitor test-subject vehicle operational parameters and diagnose a potential vehicle component failure mode by way of a comparison between the test-subject vehicle data and analyzed data previously collected from other vehicles, including data collected from other vehicles of the same type as the test-subject vehicle having a known failure condition.

Alternative embodiments in accordance with the present invention can provide a diagnostic data collector/analyzer for use in a field other than vehicle diagnostics. For example, an alternative embodiment can provide a medical diagnostic data collector/analyzer for use by medical professionals or technicians that can collect historical medical data corresponding to various normal bodily functions and abnormal bodily functions, analyze the data and compare the results of the data analysis to test data gathered from a specific patient in order to diagnose potential abnormalities in the patient. Similarly, additional alternative embodiments can provide a diagnostic data collector/analyzer for use in other fields, such as the pharmaceutical industry, the chemical industry, the petroleum industry, or the like.

The representative vehicle diagnostic data collector/analyzer can include a data compiler to gather and compile historical diagnostic data, including measured operating parameters from a number of different vehicles operating under a variety of normal conditions or failure conditions. The diagnostic data collector/analyzer can also include a data analyzer to analyze the historical diagnostic data. For example, the data analyzer can isolate and categorize data corresponding to parameters measured on a number of individual vehicle types under a variety of particular operating conditions and perform statistical analysis on the various vehicle type/operating condition combinations to define operating parameter ranges corresponding to normal operating conditions and a variety of failure conditions.

In addition, the vehicle diagnostic data collector/analyzer can include a parameter reader to measure real-time operating parameters on a specific test-subject vehicle, and a comparator to evaluate differences and similarities between the operating parameter measurements and established ranges corresponding to normal operating conditions and failure conditions. Furthermore, the diagnostic data collector/analyzer can include a condition identifier to correlate the operating parameter measurement with known operating conditions, and a virtual diagnostician to diagnose specific potential vehicle component failure modes based on the operating parameter measurements. The invention will now be described with reference to the drawing figures, in which like reference numerals refer to like parts throughout.

FIG. 1 illustrates a representative vehicle diagnostic data collector/analyzer 10 that can aid a vehicle technician in identifying potential vehicle failure modes at the component level. An embodiment of the vehicle diagnostic data collector/analyzer 10 can include a personal computer (PC) 12 or a hand-held diagnostic scan tool 14 configured to be coupled to a vehicle 16. The vehicle 16 can include an onboard computer 18 that can be accessed by way of electrical links 20, such as such as conductors, wires, cables, data buses, a communication network or a wireless network, and optionally a vehicle interface box 22 to provide signal conditioning.

The vehicle diagnostic data collector/analyzer 10 can further include a database 24 coupled to the personal computer 12 or scan tool 14, for example, by way of local links 26 and a communication network 28. In an alternative embodiment, the database 24 can be stored directed in a memory associated with the personal computer 12 or the scan tool 14.

Figure 2:
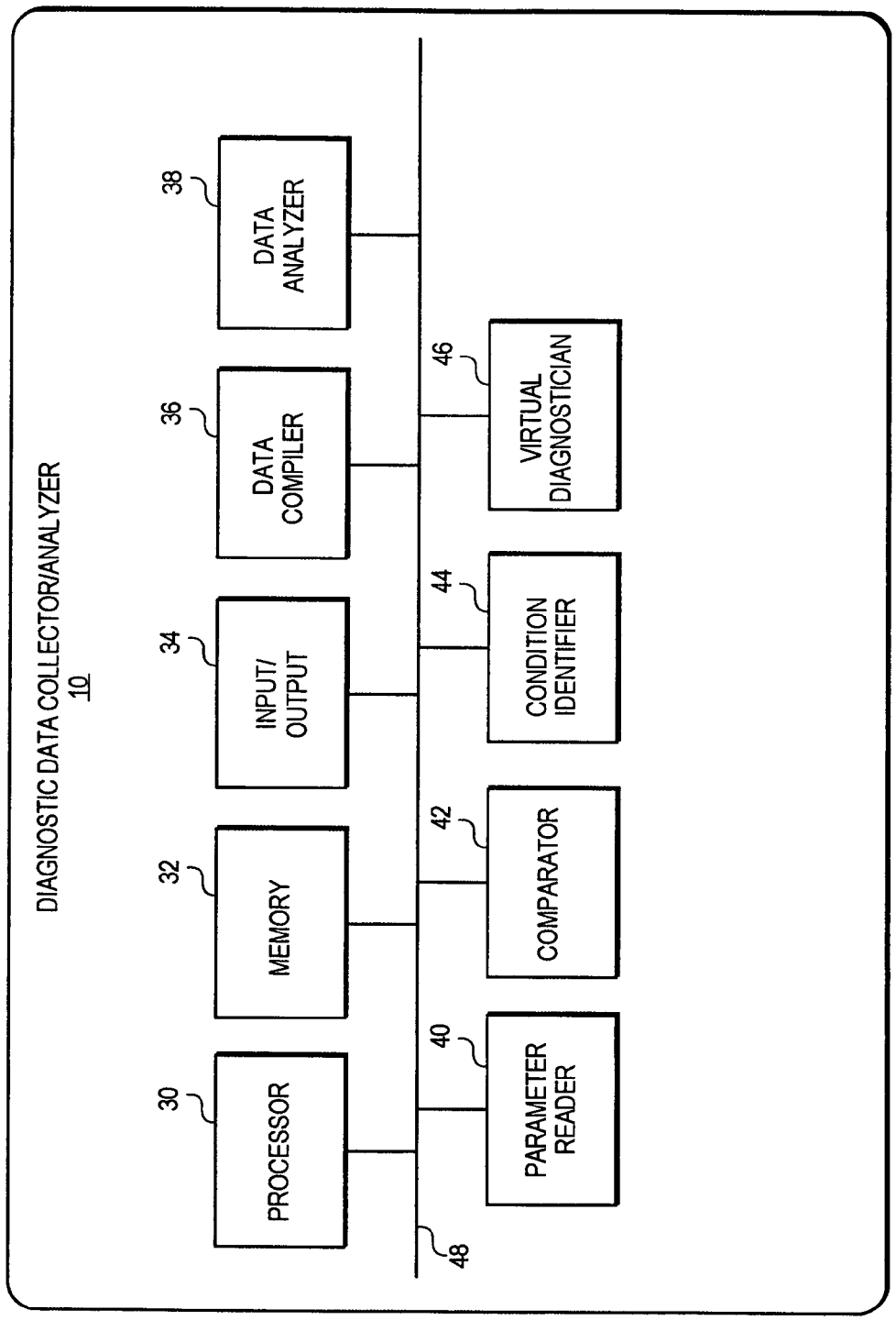
FIG. 2 is a schematic diagram illustrating the vehicle diagnostic data collector/analyzer.

FIG. 2 is a schematic diagram illustrating the vehicle diagnostic data collector/analyzer 10, which can include a processor 30, a memory 32, an input/output device 34, a data compiler 36, a data analyzer 38, a parameter reader 40, a comparator 42, a condition identifier 44, and a virtual diagnostician 46, all of which can be coupled by a data link 48. The vehicle diagnostic data collector/analyzer 10 can collect historical vehicle operational data corresponding to various normal vehicle operating conditions and vehicle component failure conditions, analyze the data and compare the results of the data analysis to test data gathered from a specific test-subject vehicle in order to diagnose potential failure conditions of vehicle components.

The processor 30, the memory 32, and the input/output (I/O) device 34 can be part of a general computing device, such as a personal computer (PC), a notebook, a UNIX workstation, a server, a mainframe computer, a personal digital assistant (PDA), a mobile telephone, or some combination of these. Alternatively, the processor 30, the memory 32 and the input/output device 34 can be part of a specialized computing device, such as a vehicle diagnostics scan tool 14. The remaining components can include programming code, such as source code, object code or executable code, stored on a computer-readable medium that can be loaded into the memory 32 and processed by the processor 30 in order to perform the desired functions of the vehicle diagnostic data collector/analyzer 10.

In various embodiments, the vehicle diagnostic data collector/analyzer 10 can be coupled to a communication network 28, which can include any viable combination of devices and systems capable of linking computer-based systems, such as the Internet; an intranet or extranet; a local area network (LAN); a wide area network (WAN); a direct cable connection; a private network; a public network; an Ethernet-based system; a token ring; a value-added network; a telephony-based system, including, for example, T1 or E1 devices; an Asynchronous Transfer Mode (ATM) network; a wired system; a wireless system; an optical system; a combination of any number of distributed processing networks or systems or the like.

An embodiment of the vehicle diagnostic data collector/analyzer 10 can be coupled to the communication network 28 by way of local data link 26, which in various embodiments can incorporate any combination of devices—as well as any associated software or firmware—configured to couple processor-based systems, such as modems, network interface cards, serial buses, parallel buses, LAN or WAN interfaces, wireless or optical interfaces and the like, along with any associated transmission protocols, as may be desired or required by the design.

An embodiment of the vehicle diagnostic data collector/analyzer 10 can communicate information to the user and request user input by way of an interactive, menu-driven, visual display-based user interface, or graphical user interface (GUI). The user interface can be executed, for example, on a personal computer (PC) with a mouse and keyboard, with which the user may interactively input information using direct manipulation of the GUI displayed, for example, on a PC monitor, or another input/output device 34, such as a microphone. Direct manipulation can include the use of a pointing device, such as a mouse or a stylus, to select from a variety of selectable fields, including selectable menus, drop-down menus, tabs, buttons, bullets, checkboxes, text boxes, and the like. Nevertheless, various embodiments of the invention may incorporate any number of additional functional user interface schemes in place of this interface scheme, with or without the use of a mouse or buttons or keys, including for example, a trackball, a touch screen or a voice-activated system.

Figure 3:
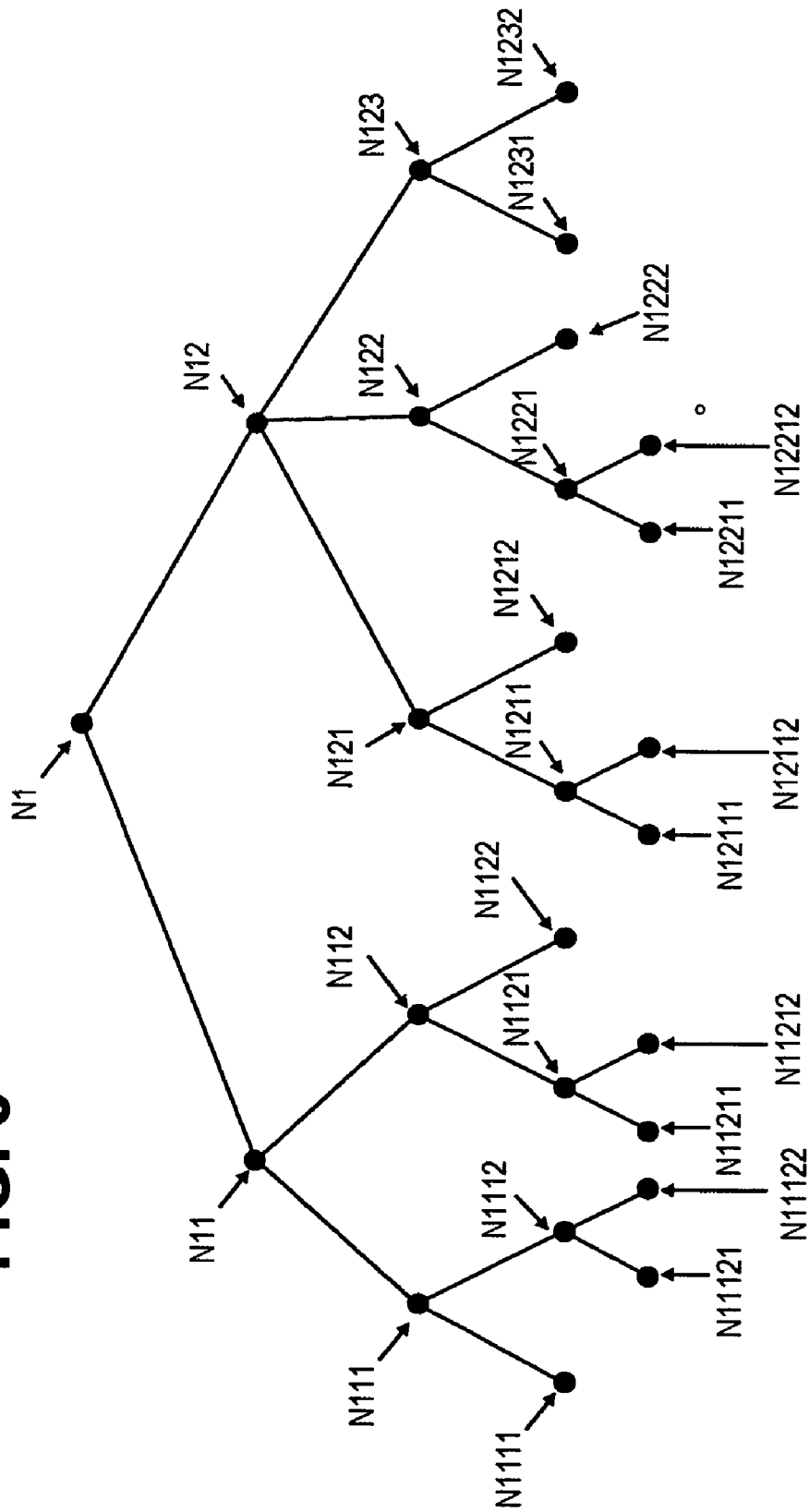
FIG. 3 illustrates a representative tree graph representation of a data structure that can be implemented by the vehicle diagnostic data collector/analyzer.

The vehicle diagnostic data collector/analyzer 10 can define or utilize a predefined component taxonomy corresponding to the vehicle, for example, in the form of a connected acyclic directed graph, such as that shown in FIG. 3. Thus, viewing the graph of FIG. 3 as an abstraction of a component taxonomy, each node of the graph can represent a component, $CT_n$, of the vehicle. For example, the root node N1 can represent the vehicle as a single unit. Each node connected to the root node N1 can represent a major component of the vehicle. For example, node N11 can represent an engine, and node N12 can represent a transmission. Likewise, each of the connected "sibling" nodes can represent an individual subcomponent. For example, node N111 can represent a fuel control unit, and node N112 can represent an oxygen sensor, and so on.

In association with the component taxonomy, the diagnostic data collector/analyzer 10 can also define or utilize a predefined fault taxonomy, by associating one or more failure modes with each component node, $FM_n^* = \{FM_{n1}, \ldots, FM_{nm}\}$. For example, each associated failure mode can describe a specific modality of failure for the component, and the set of failure modes associated with a particular component, $FM_n^*$, can represent all known ways the particular component can fail.

In addition, the diagnostic data collector/analyzer 10 can define or utilize a predefined diagnostic taxonomy by associating at least one failure mode test, $FMT_{xy}$, with each failure mode, $FM_{xy}$, which can be interpreted as an elementary diagnostic procedure intended to prove or disprove (conclusively or inconclusively) a hypothesis regarding the presence of a particular failure mode. Furthermore, the diagnostic data collector/analyzer 10 can define a repair taxonomy by associating at least one repair procedure with each failure mode.

Returning to FIG. 2, the data compiler 36 can gather and organize historical vehicle diagnostic data samples corresponding to various normal vehicle operating conditions and vehicle component failure conditions. Thus, the historical diagnostic data can include various measured operating parameters from a number of different vehicles operating under a variety of normal conditions or failure conditions. Historical data can be collected as a "snapshot"—a single set of measurements at a moment in time—or as a "data strip"—a sequence or series of periodic measurements taken over a period of time. For example, the data compiler can collect historical operating parameter data including, for example, the following:

an ignition switch position
an engine run condition
a throttle position
an engine speed
a vehicle speed
a test equipment connection
a vehicle electrical connection condition
an ambient air temperature
an engine inlet temperature
an engine lubricant pressure
an engine lubricant temperature
an engine lubricant level
an engine coolant temperature
an engine coolant specific gravity
an engine exhaust gas temperature
an engine exhaust gas content
a transmission setting
a brake pedal position
a parking brake position
a brake fluid pressure
a fuel level
a fuel supply pressure
a battery voltage
a battery charging system voltage
a battery charging system current
an ignition voltage
an ignition current
an engine cylinder compression The data compiler 36 can create a database 24 in which to accumulate the historical data, for example, a relational database that associates each instance of measured parameters with a definition or description of the prevailing ambient and operating conditions under which the data were gathered. For example, the database 24 can associate the historical data with a vehicle manufacturer, make and model, as well as ambient conditions during which the data were recorded, fault codes previously or simultaneously recorded by the vehicle onboard computer 18, operational problems or symptoms observed in association with the recording of the data, and any known failure conditions present during the recording of the data.

In some embodiments of the vehicle diagnostic data collector/analyzer 10 this information can be recorded automatically, for example, by the personal computer 12 or by the scan tool 14. For example, a scan tool 14, including existing scan tools, can be programmed to automatically collect vehicle operating parameters each time the scan tool 14 is connected to a vehicle. In other embodiments, a scan tool 14 can be programmed to record vehicle operating parameters when explicitly requested, for example, in response to a user input by way of an input/output device 34.

In still other embodiments, the condition factors or historical data information can be entered by a user, for example, by way of direct manipulation of a menu listing possible conditions. Furthermore, the vehicle diagnostic data can be collected by way of the vehicle onboard computer 18, for example, recording data items that are monitored by the onboard computer 18, such as engine speed, engine coolant temperature, and the like. The data signals can optionally be subjected to signal conditioning, for example, by the vehicle interface box 22. Moreover, the vehicle diagnostic data can be collected by way of another monitoring device, such as an analog or digital multimeter.

Thus, historical data collection can be implemented by a vehicle diagnostic system. Examples of compatible PC-based vehicle diagnostic methods and systems are disclosed in U.S. Pat. No. 5,631,831, entitled "Diagnosis Method for Vehicle Systems," to Bird, et al., dated May 20, 1997, and in copending U.S. patent application Ser. No. 11/452,249, entitled "Dynamic Decision Sequencing Method and Apparatus," filed Jun. 14, 2006 by Fountain, et al., the disclosures of which are hereby incorporated by reference in their entirety.

An example of a suitable vehicle diagnostics scan tool 14 compatible with an embodiment of the present invention is the Genisys™ scan tool, manufactured by the OTC Division of the SPX Corporation in Owatonna, Minnesota. A variety of features of the Genisys™ system are disclosed in U.S. patents, such as U.S. Pat. Nos. 6,236,917; 6,538,472; 6,640,166; 6,662,087; and 6,874,680; the disclosures of which are incorporated herein by reference in their entirety.

However, other embodiments are compatible with additional vehicle diagnostic tools, including any number of commercially available makes and models, such as the SUPER AutoScanner and the EZ 3/4/5/6000 Scan Tools, also manufactured by the the SPX Corporation; the StarSCAN scan tool, manufactured for DaimlerChrysler Corporation by SPX; or the Snap-on Scanner, MicroSCAN, MODIS, or SOLUS series, manufactured by Snap-on Technologies, Inc.; or any other device capable of receiving and processing vehicle diagnostic data from a vehicle onboard computer, such as a personal computer (PC) or a personal digital assistant (PDA).

Furthermore, in some embodiments of the vehicle diagnostic data collector/analyzer 10, the data compiler 36 can automatically, or optionally, upon manual request, send the historical data to central repository, such as a remote database 24, for example, over a communication network 28, such as a local area network (LAN), an intranet or the Internet. Thus, historical data from numerous distinct sites, such as repair centers around a nation or around the world, can be transmitted to a central databank for storage or analysis. The data can be further associated or categorized within the database 24 according to various factors, including site of origin, ambient condition, failure condition, and the like. Thus, examples of historical data categories could include the following:

- Mercury Cougar XL, 2.5 L V6, automatic transmission, 20-30,000 miles, warmed-up idle, no fault code, Seattle, Wash., 70-74° F.
- Pontiac Solstice, 2.4 L 4-cyl., 5-speed manual transmission, factory new, 3200 rpm, fault code 342, Detroit, Mich, 55-59° F.
- Toyota RAV4, 2.0 L 4-cyl., 5-speed manual transmission, 4WD, 40-50,000 miles, warmed-up idle, high CO emission, Washington, D.C., 95-99° F.
- Volvo V70, 2.5 L 5-cyl. Turbo, automatic transmission, 0-10,000 miles, starter crank, cranks but does not start, Göteborg, Sweden, 20-24° F.

The data analyzer 38 can analyze historical data samples to determine typical ranges for operating parameter measurements corresponding to various normal and failure conditions. For example, the data analyzer 38 can isolate data samples corresponding to parameters measured on an individual vehicle type under a particular operating condition or failure condition, and perform statistical analyses on the data samples to define operating parameter ranges corresponding to the particular operating condition or failure condition. Various levels of parameter ranges can be established, for example, "ideal," "OK-lower-limit," "OK-upper-limit," "warning," "danger," etc.

The statistical analyses can include calculating, for example, a minimum value, a maximum value, a mean value and a variance or standard deviation for a group of snapshot data sets, an individual data strip, or a set of data strips. In addition, the statistical analyses can identify and eliminate outliers, or data samples that are significantly outside an expected range. Furthermore, a relationship between data sets or between a group of data strips can be expressed as a correlation data strip, for example, having minimum, maximum and mean values, variance, standard deviation, and periodicity that can be statistically evaluated.

Furthermore, data strips, including multiple simultaneous data strips, can be evaluated using linear transforms, such as the Fourier transform. For example, the data strips can be decomposed into discrete units, such as sinusoids of varying frequency and amplitude, that correspond to known conditions or subconditions that can be identified in the database 24.

In some embodiments of the vehicle diagnostic data collector/analyzer 10, the data analyzer 38 can define a diagnostic case history, "DC*," as an ordered list of diagnostic cases, that is historical data samples, "p," corresponding to a particular diagnosis, or failure condition, for example:

$$DC = \{ <p_{11}, diagnosis_{<1,1>}>,$$
$$<p_{12}, diagnosis_{<1,2>}>,$$
$$\vdots$$
$$<p_{nm}, diagnosis_{<n,m>}> \}$$

Thus, the diagnosis can correspond to an end-node, or leaf, in the diagnostic taxonomy.

Furthermore, in some embodiments of the vehicle diagnostic data collector/analyzer 10, the historical data samples, "p," can be represented as a point in a multidimensional vector space having dimensionality equal to the number of measured parameters, "k." Thus, for a particular vehicle type, "V," the data analyzer 38 can define a parameter state space, "P," as a "k"-dimensional Euclidean space representing the value range of all "k" measured parameter values in a set of historical data samples. Thus, in general, each historical data sample, "p," is represented by a single point in the parameter state space, "P."

The data analyzer 38 can further define a normal range, or nominal range, in "P" for each parameter, "p," that corresponds to the historical data samples representing a normal operating condition free of vehicle component failures, that is, data samples taken from vehicles known to be well-functioning and not exhibiting symptoms, such as observed operational problems or fault codes set by the onboard computer 18. Thus, the data analyzer 38 can associate with the vehicle type, "V," a "k"-dimensional subset of "P," designated "$P^{Normal}$," embedded within the surface of a manifold, "$M^{Normal}$," having dimensionality "k−1".

In a similar fashion, the data analyzer 38 can define multiple subsets of "P," collectively "$P^{Abnormal}$," including parameter state spaces corresponding to historical data samples from vehicles operating under a diagnosed failure condition, $\{P^{Failure}_{<1,1>}, \ldots, P^{Failure}_{<n,m>}\}$. Thus, the failure condition operating parameter spaces, $\{P^{Failure}_{<1,1>}, \ldots, P^{Failure}_{<n,m>}\}$, can be derived from the diagnostic case histories, "DC*." Each member, "$P^{Failure}_{<p,q>}$," of the set, "$P^{Abnormal}$," can represent the parameter state space of expected parameter values corresponding to a manifestation of a particular failure mode, "$FM^p_q$," which indicates the presence of a specific failure modality of a vehicle component, $CT_p$.

Figure 4:
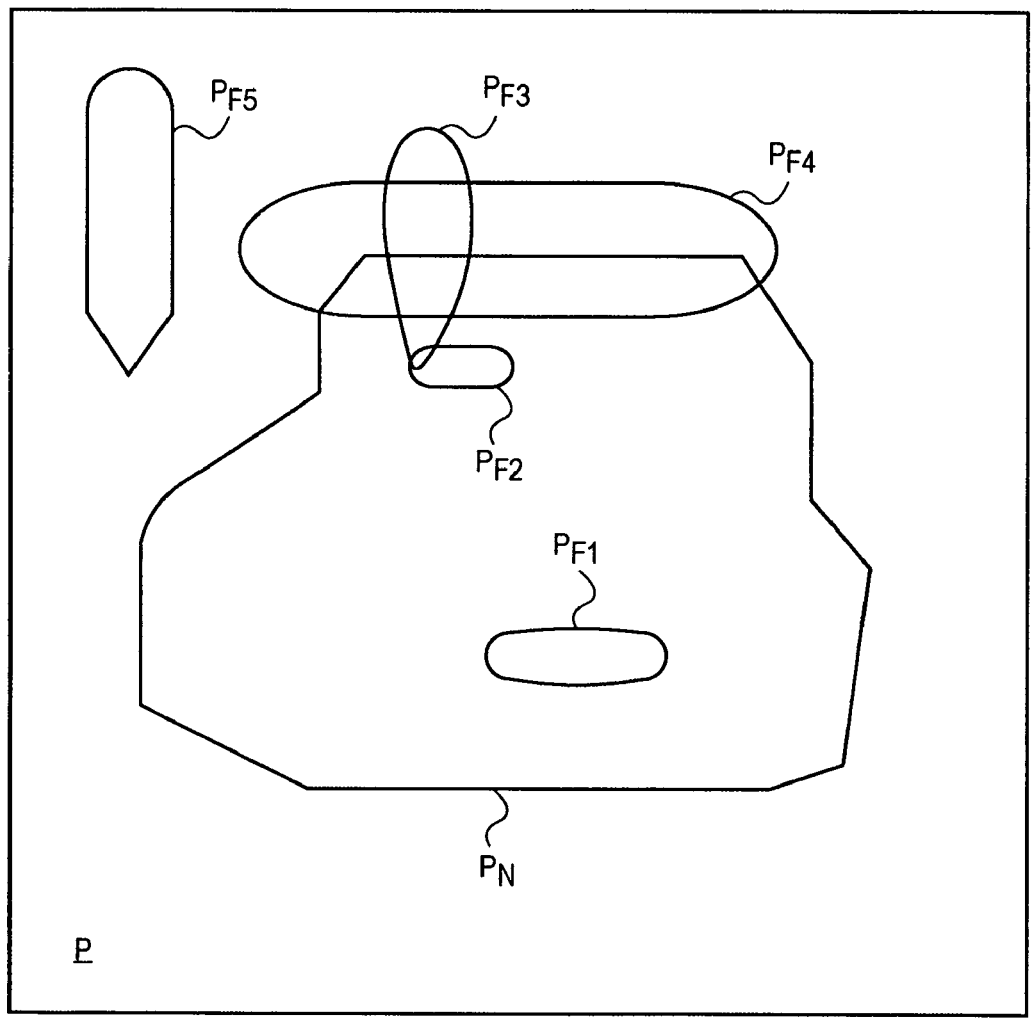
FIG. 4 is a diagrammatic representation illustrating a 2-dimensional parameter state space.

FIG. 4 is a diagrammatic representation of a 2-dimensional parameter state space P, which for purposes of demonstration can be viewed as an abstraction of a higher-dimensional parameter space. The abstract representation of FIG. 4 can be expanded to any dimensionality, representing any number of measured parameters. Within the parameter state space P, are various parameter spaces representing different operating conditions corresponding to a vehicle type. For example, the normal operating condition parameter space $P_N$ represents a parameter space corresponding to normal vehicle operation without any component failures present. The additional parameter spaces $P_{F1}$, $P_{F2}$, $P_{F3}$, $P_{F4}$ and $P_{F5}$ correspond to failure operating conditions of the vehicle where some vehicle component failure is present.

The areas of P where two or more of the parameter spaces overlap represent parameter spaces wherein one of the operating conditions may exist, or wherein more than one operating condition may coexist. For example, within the area representing the intersection of $P_N$, $P_{F2}$ and $P_{F3}$, the vehicle may be operating normally; or either a failure condition corresponding to $P_{F2}$ may exist, or a failure condition corresponding to $P_{F3}$ may exist; or a dual failure condition corresponding to both $P_{F2}$ and $P_{F3}$ may exist. Regarding the areas where two or more of the parameter spaces overlap, statistical analyses known in the art, such as a method of Baysian analysis, can be implemented to provide a probabilistic estimate of the likelihood of the existence of any one of the corresponding operating conditions or failure modes.

On the other hand, areas of P where only one parameter space is present represent parameter spaces wherein a specific condition conclusively exists. For example, within the area of parameter space $P_{F5}$, a specific component failure modality can be conclusively inferred from the operating condition, since parameter space $P_{F5}$ is uniquely associated with a specific component failure, and the vehicle can be identified as requiring a repair procedure.

Returning once again to FIG. 2, based on the normal operating parameter space, "$P^{Normal}$," and the various failure condition parameter spaces, $\{P^{Failure}_{<1,1>}, \ldots, P^{Failure}_{<n,m>}\}$, combined with the diagnostic case histories, "DC*," the data analyzer 38 can further define a diagnostic parameter categorization, "PC," as a list of 2-tuplets associating each specific failure mode with a corresponding failure condition parameter space, for example:

$$PC = \{ < \text{No\_Fault}, P_{Normal} >,$$
$$< FM_{11}, P^{Failure}_{<1,1>} >,$$
$$< FM_{12}, P^{Failure}_{<1,2>} >,$$
$$\vdots$$
$$< FM_{nm}, P^{Failure}_{<n,m>} >\}$$

In the case that any portion of the parameter state space P (see FIG. 4) is not a member of the union of the normal operating parameter space $P^{Normal}$ and the abnormal operating parameter space, "$P^{Abnormal}$" ($P_{F1}$, $P_{F2}$, $P_{F3}$, $P_{F4}$ and $P_{F5}$ in the example of FIG. 4), then the parameter categorization, "PC," can be said to be 'incomplete.' On the other hand, if the parameter state space P is equal to the union of the normal operating parameter space $P^{Normal}$ and the abnormal operating parameter space, "$P^{Abnormal}$," then the parameter categorization, "PC," can be said to be 'complete.'

In some embodiments of the vehicle diagnostic data collector/analyzer 10, the data analyzer 38 can derive the failure condition operating parameter spaces, $\{P^{Failure}_{<1,1>}, \ldots P^{Failure}_{<n,m>}\}$, as well as the parameter categorization, "PC," from the diagnostic case history, "DC*," utilizing methods of automated reasoning that are known in the art. For example, the data analyzer 38 can implement a method of automated reasoning from the field of manifold learning, including linear methods such as principal component analysis, multi-dimensional scaling, or the like, as well as non-linear methods such as local linear embedding, ISOMAP, Laplacian eigenmap, or the like, in order to create for each set of cases relating to a failure modality of a specific component, an optimized "k−1"-dimensional manifold, which will define, by enclosure, the corresponding set $P^{Failure}_{<a,x>}$.

In an alternative embodiment of the vehicle diagnostic data collector/analyzer 10, the data analyzer 38 can derive the failure condition operating parameter spaces, $\{P^{Failure}_{<1,1>}, \ldots, P^{Failure}_{<n,m>}\}$ as well as the parameter categorization, "PC," from the diagnostic case history, "DC*," utilizing methods from the field of neural networks that are known in the art. In yet another alternative embodiment, the data analyzer 38 can derive the failure condition operating parameter spaces, $\{P^{Failure}_{<1,1>}, \ldots, P^{Failure}_{<n,m>}\}$, as well as the parameter categorization, "PC," from the diagnostic case histories, "DC*," utilizing genetic algorithms that are known in the art.

Furthermore, in some embodiments, the data analyzer 38 can construct a variable probabilistic parameter categorization by associating with each failure mode, "$FM^p_q$," a "k"-dimensional probability distribution, selected from such distributions known in the art, characterized by a mean value and a "k"-dimensional variable variance vector. The data analyzer 38 can further optimize the probabilistic parameter categorization, using methods that are known in the art, for example a method from the field of optimization theory. Thus, the data analyzer 38 can identify an optimal variance vector to fit the diagnostic case history, "DC*."

In an yet other embodiments, as a generalization of above, the data analyzer 38 can construct a variable probabilistic parameter categorization by associating with each failure mode, "$FM^p_q$," a "k"-dimensional probability density function, characterized by a parameterization vector. The data analyzer 38 can further optimize the probabilistic parameter categorization, using methods that are known in the art, for example, a method from the field of optimization theory. Thus, the data analyzer 38 can identify an optimal parameterization vector to fit the diagnostic case history, "DC*."

Moreover, in some embodiments of the vehicle diagnostic data collector/analyzer 10, the data analyzer 38 can perform a dimensionality reduction algorithm on the diagnostic case history, "DC*," or on the parameter categorization, "PC." The dimensionality reduction algorithm can be selected from those known in the art, including trivial, linear or non-linear dimensionality reduction algorithms. For example, performing a trivial dimensionality reduction on the diagnostic case history, "DC*," could have the advantage of removing from consideration parameters that have no significant diagnostic impact.

The parameter reader 40 can record real-time measurements of operating parameters on a specific test-subject vehicle selected for diagnosis. For example, in some embodiments of the vehicle diagnostic data collector/analyzer 10, operating parameters can be recorded by the personal computer 12 or by the scan tool 14. The parameter reader 40 can record the measurements of operating parameters as a "snapshot"—a single set of measurements at a moment in time—or as a "data strip"—a sequence or series of periodic measurements taken over a period of time.

In addition, in some embodiments of the vehicle diagnostic data collector/analyzer 10, the parameter reader 40 can incorporate test instructions that can be displayed or presented aurally to instruct a vehicle technician to perform certain functions while the operating parameters are recorded, such as "start vehicle," "idle engine for 2 minutes," "maintain 3,000 rpm for 30 seconds," or the like. In other embodiments, operating parameters can be entered by a user, for example, by way of a keyboard or other entry keys.

Furthermore, parameter reader 40 can receive the operating parameters by way of the vehicle onboard computer 18, for example, recording data items that are monitored by the onboard computer 18, such as engine speed, engine coolant temperature, and the like. Additionally, the parameter reader 40 can optionally receive the operating parameter signals by way of a signal conditioner, for example, the vehicle interface box 22 shown in FIG. 1. Moreover, parameter reader 40 can record the operating parameters by way of another monitoring device, such as an analog or digital multimeter.

The comparator 42 can evaluate similarities and differences between the operating parameter measurements recorded by the parameter reader 40 from the test-subject vehicle and the established ranges corresponding to normal operating conditions and failure conditions, including multiple ranges represented by a multidimensional manifold.

Based on the results from the comparator 42, the condition identifier 44 can correlate the operating parameter measurements from the test-subject vehicle with known operating conditions, including normal operating conditions and failure conditions. The condition identifier 44 can thus identify a known operating condition that corresponds to the operating parameter measurements from the test-subject vehicle, for example, a failure condition corresponding to a failure condition operating parameter space, "$P^{Failure}_{<p,q>}$," from the set, "$P^{Abnormal}$," or a normal operating condition corresponding to the normal operating parameter space, "$P^{Normal}$."

Additionally, the virtual diagnostician 46, can diagnose specific potential vehicle component failure modes that may be present in the test-subject vehicle based on the operating parameter measurements corresponding to a known failure mode in the diagnostic parameter categorization, "PC," such as a failure mode corresponding to a failure condition operating parameter space, "$P^{Failure}_{<p,q>}$," from the set, "$P^{Abnormal}$."

For example, given the test-subject vehicle type, along with the corresponding component taxonomy, CT, diagnostic taxonomy, DT, and diagnostic case history, DC*, based on the parameter categorization, PC, the virtual diagnostician 46 can implement deductive logic to infer either a conclusive diagnosis, such as a specific failure mode, $FM_{pq}$, of a vehicle component, $CT_p$, or a prioritized sequence of possible failure modes that may be present in the test-subject vehicle, for example, $<FM_{p1q1}, FM_{p2q2}, FM_{p3q3}, \ldots FM_{p\_nq\_n}>$. In some embodiments of the vehicle diagnostic data collector/analyzer 10, the deductive logic can be implemented as Baysian reasoning, including an iterated or recursive application of Bayes theorem.

Figure 5:
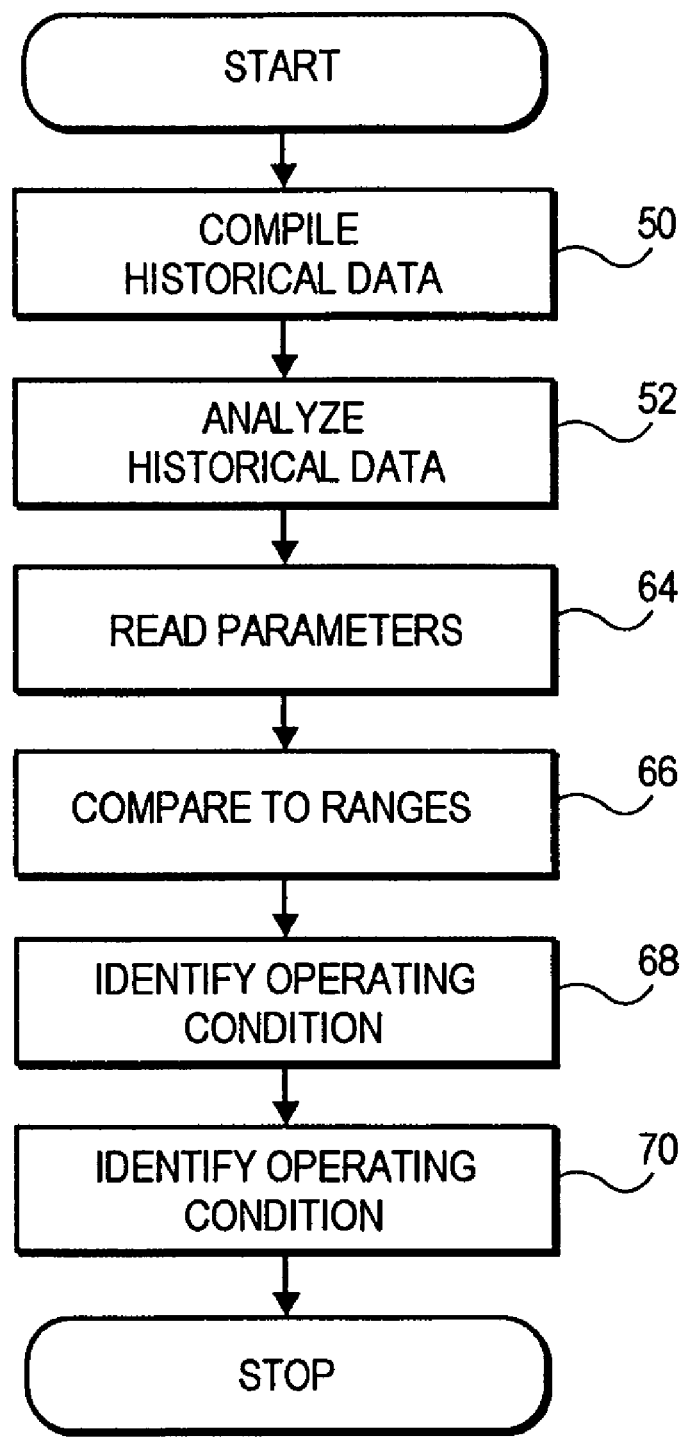
FIG. 5 is a flowchart illustrating steps that may be followed in accordance with one embodiment of the method or process of collecting and analyzing diagnostic data to diagnose potential failure conditions in a vehicle.

FIG. 5 is a flowchart illustrating a sequence of steps that can be performed in order to collect historical vehicle operational data corresponding to various normal vehicle operating conditions and vehicle component failure conditions, analyze the data and compare the results of the data analysis to test data gathered from a specific test-subject vehicle in order to diagnose potential failure conditions of vehicle components. The process can begin by proceeding to step 50, "Compile Historical Data," wherein historical vehicle diagnostic data samples corresponding to various normal vehicle operating conditions and vehicle component failure conditions gathered and organized, as described above.

As explained above, the historical diagnostic data can include various measured operating parameters from a number of different vehicles operating under a variety of normal conditions or failure conditions. Furthermore, the historical data can be collected as a "snapshot"—a single set of measurements at a moment in time—or as a "data strip"—a sequence or series of periodic measurements taken over a period of time.

The data can be accumulated in a database, such as a relational database that associates each instance of measured parameters with a definition or description of the prevailing ambient and operating conditions under which the data were gathered, as further described above. In some embodiments, the data can be sent to a central repository, for example, over a communication network.

Then, in step 52, "Analyze Historical Data," the historical diagnostic data samples can be analyzed to determine typical ranges for operating parameter measurements corresponding to various normal and failure conditions, as described above. In this step, a diagnostic case history can be defined, for example, as an ordered list of diagnostic cases, that is historical data samples corresponding to a particular diagnosis, or failure condition.

Figure 6:
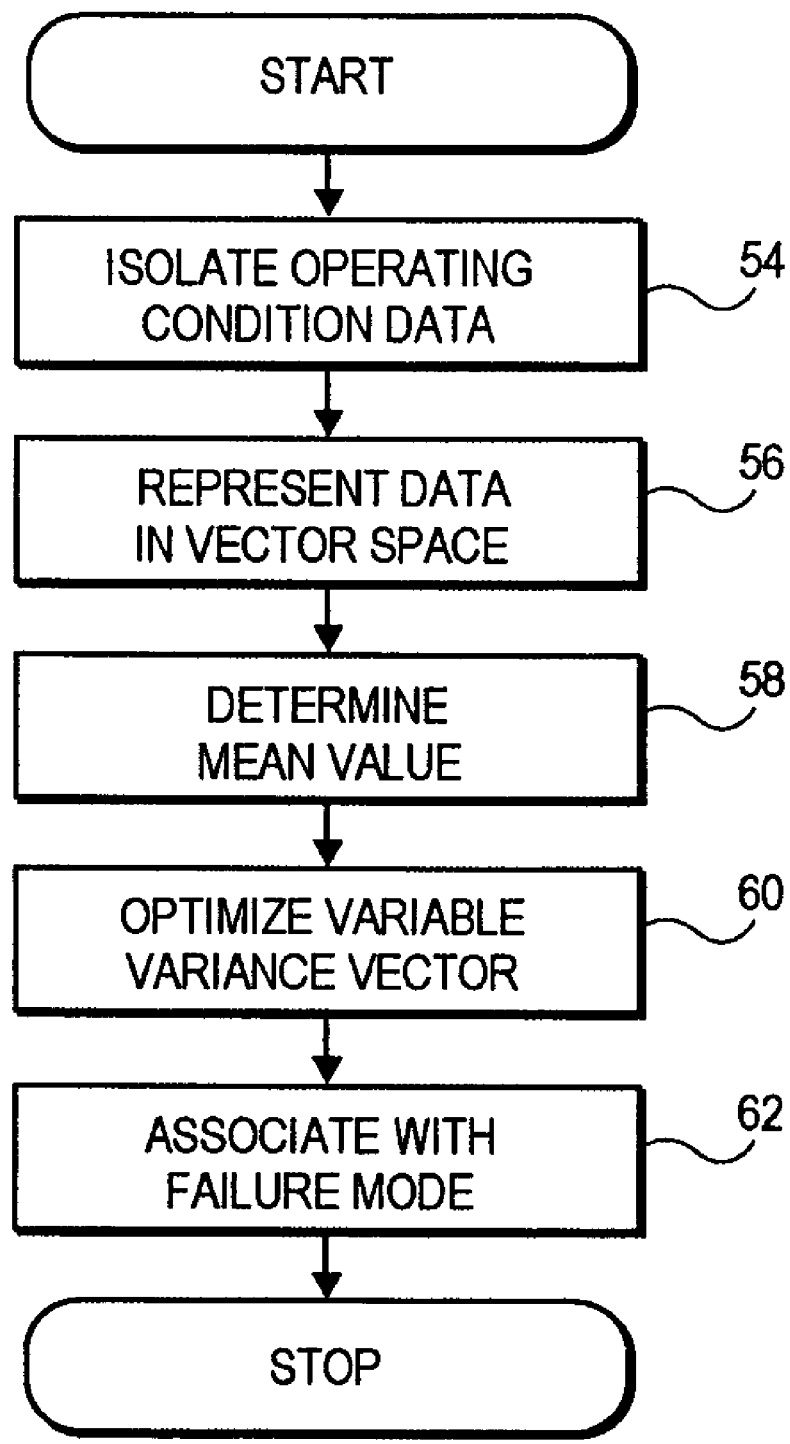
FIG. 6 is a flowchart illustrating steps that may be followed in accordance with the method or process of collecting and analyzing diagnostic data in order to analyze historical vehicle diagnostic data.

In further explanation of this step, FIG. 6 is a flowchart illustrating a sequence of more detailed steps that can performed in some embodiments in order to analyze the historical data. This process can begin by proceeding to step 54, "Isolate Operating Condition Data," wherein the historical diagnostic data samples can be separated into different sets taken from different vehicle types at discrete operating conditions.

Then, in step 56, "Represent Data in Vector Space," the historical data samples can be represented as points in a multidimensional vector space having dimensionality equal to the number of measured parameters and a variable probabilistic parameter categorization can be constructed by associating with each diagnostic case a "k"-dimensional probability distribution. Accordingly, in step 58, "Determine Mean Value," a mean value can be statistically calculated for each sample set, as explained above. Correspondingly, in step 60, "Optimize Variable Variance Vector," a "k"-dimensional variable variance vector can be optimized to best fit the diagnostic case history using a method from the field of optimization theory, as further explained above.

In addition, in step 62, "Associate with Failure Mode," a diagnostic parameter categorization can be defined as a list of 2-tuplets associating each specific failure mode with a corresponding failure condition parameter space, as described above. As also explained above, the analyses can include methods of automated reasoning, for example, from the field of manifold learning, and the failure condition operating parameter spaces, as well as the parameter categorization, can be derived from the diagnostic case history utilizing methods from the field of neural networks or using genetic algorithms.

Returning to FIG. 5, subsequently, in step 64, "Read Parameters," real-time measurements of operating parameters from a specific test-subject vehicle selected for diagnosis can be recorded, as described above. Again here, the measurements can be recorded as a "snapshot" or as a "data strip." Next, in step 66, "Compare to Ranges," similarities and differences can be evaluated between the recorded measurements from the test-subject vehicle and the established ranges corresponding to normal operating conditions and failure conditions, including multiple ranges represented by a multidimensional manifold, as further explained above.

Additionally, in step 68, "Identify Operating Condition," the operating parameter measurements from the test-subject vehicle can be correlated with known operating conditions, including normal operating conditions and failure conditions, as further explained above. Correspondingly, in step 70, "Diagnose Potential Failure Modes," specific potential vehicle component failure modes that may be present in the test-subject vehicle can be diagnosed based on the operating parameter measurements corresponding to a known failure mode in the diagnostic parameter categorization, as also explained above.

FIGS. 2, 5 and 6 are block diagrams and flowcharts of methods, apparatuses and computer program products according to various embodiments of the present invention. It will be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus according to the present invention can include other means, such as hardware or some combination of hardware and software, including one or more processors or controllers, for performing the disclosed functions.

In this regard, FIG. 2 depicts the apparatus of one embodiment including several of the key components of a general-purpose computer by which an embodiment of the present invention may be implemented. Those of ordinary skill in the art will appreciate that a computer can include many more components than those shown in FIG. 2. However, it is not necessary that all of these generally conventional components be shown in order to disclose an illustrative embodiment for practicing the invention. The general-purpose computer can include a processing unit and a system memory, which may include random access memory (RAM) and read-only memory (ROM). The computer also may include nonvolatile storage memory, such as a hard disk drive, where additional data can be stored.

An embodiment of the present invention can also include one or more input or output devices 16, such as a mouse, keyboard, monitor, and the like. A display can be provided for viewing text and graphical data, as well as a user interface to allow a user to request specific operations, including for example, a speaker, headphones or a microphone. Furthermore, an embodiment of the present invention may be connected to one or more remote computers via a network interface. The connection may be over a local area network (LAN) wide area network (WAN), and can include all of the necessary circuitry for such a connection.

Typically, computer program instructions may be loaded onto the computer or other general purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touchscreen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A computer-implemented method of analyzing vehicle test data, comprising:
   compiling, via a processor of a diagnostic device, a collection of historical test data points which includes a plurality of operating parameter measurements recorded by an individual vehicle's onboard computer, wherein the diagnostic device and the vehicle are separate but connectable objects;
   correlating, via the processor, each historical test data point with an operating condition to produce entries of a diagnostic case history;
   grouping, via the processor, the entries of the diagnostic case history by operating condition;
   defining, via the processor, a range corresponding to the operating condition of a vehicle type based on the collection of test data points of the entries of the diagnostic case history grouped by operating condition; and
   diagnosing, via the processor, a vehicle component failure mode based on the range corresponding to a failure condition;
   wherein the operating parameters are selected from the group consisting of: an ignition switch position, an engine run condition, a throttle position, an engine speed, a vehicle speed, a test equipment connection, a vehicle electrical connection condition, an ambient air temperature, an engine inlet temperature, an engine lubricant pressure, an engine lubricant temperature, an engine lubricant level, an engine coolant temperature, an engine coolant specific gravity, an engine exhaust gas temperature, an engine exhaust gas content, a transmission setting, a brake pedal position, a parking brake position, a brake fluid pressure, a fuel level, a fuel supply pressure, a battery voltage, a battery charging system voltage, a battery charging system current, an ignition voltage, an ignition current, and an engine cylinder compression.

2. The computer-implemented method of claim 1, wherein the test data points correspond to a plurality of vehicles under a plurality of discrete operating conditions.

3. The computer-implemented method of claim 1, wherein the operating condition corresponds to a normal operation of one or more individual vehicles of the vehicle type.

4. The computer-implemented method of claim 1, wherein the operating condition corresponds to the failure mode existing in one or more individual vehicles of the vehicle type.

5. The computer-implemented method of claim 1, wherein each of the test data points comprises a single set of operational parameter measurements recorded at a moment in time.

6. The computer-implemented method of claim 1, wherein each of the test data points comprises a sequence of operational parameter measurements recorded over a period of time.

7. The computer-implemented method of claim 1, wherein the step of defining comprises a method of automated reasoning.

8. The computer-implemented method of claim 7, wherein the automated reasoning comprises at least a method of manifold learning.

9. The computer-implemented method of claim 1, further comprising:
   representing each of the test data points as a point in a multidimensional vector space; and
   statistically analyzing a set of the test data points corresponding to the operating condition to define a parameter space corresponding to the operating condition in the multidimensional vector space, wherein the parameter space comprises the range.

10. The computer-implemented method of claim 9, wherein the step of statistically analyzing further comprises:
    associating with the set a multidimensional probability distribution having a mean value and a multidimensional variable variance vector; and
    optimizing the parameter space by identifying an optimal variance vector based on the set.

11. The computer-implemented method of claim 9, wherein the step of statistically analyzing further comprises mapping the failure mode to the parameter space.

12. The computer-implemented method of claim 9, further comprising performing a dimensionality reduction procedure on the set of test data points and a correlated set of diagnoses corresponding to at least some of the operating conditions.

13. The computer-implemented method of claim 9, further comprising performing a dimensionality reduction procedure on a plurality of failure modes and a correlated plurality of parameter spaces.

14. The computer-implemented method of claim 1, further comprising:
    measuring at least one of a plurality of operational parameters of a test-subject vehicle;
    comparing at least one of the measured parameters to the range; and
    determining an operating condition of the vehicle based on one or more of the compared parameters lying within the range.

15. The computer-implemented method of claim 14, further comprising apprising a user of the operating condition.

16. The computer-implemented method of claim 14, further comprising identifying the operating condition as normal based on the range corresponding to a normal operating condition.

17. The computer-implemented method of claim 14, further comprising:
    representing each of the measured parameters as a point in a multidimensional vector space; and
    diagnosing the failure mode based on the point lying within a predefined first parameter space corresponding to the failure mode existing in one or more individual vehicles of the vehicle type, wherein the parameter space comprises the range and the step of comparing further comprises verifying whether the point lies within the parameter space.

18. The computer-implemented method of claim 17, further comprising statistically analyzing the point with respect to the first parameter space and a predefined second parameter space to determine a probability that the failure mode exists when the point lies within at least the first parameter space and the second parameter space, wherein the first parameter space is associated with the failure mode and the second parameter space is associated with a different failure mode, and the first parameter space at least partially overlaps the second parameter space.

19. A computer program product for analyzing vehicle test data, comprising a computer-readable medium encoded with instructions configured to be executed by a processor in order to perform predetermined operations comprising:
   compiling, via the processor of a diagnostic device, a collection of historical test data points which includes a plurality of operating parameter measurements recorded by an individual vehicle's onboard computer, wherein the diagnostic device and the vehicle are separate but connectable objects;
   correlating, via the processor, each historical test data point with an operating condition to produce entries of a diagnostic case history;
   grouping, via the processor, the entries of the diagnostic case history by operating condition;
   defining, via the processor, a range corresponding to the operating condition of a vehicle type based on the collection of test data points of the entries of the diagnostic case history grouped by operating condition; and
   diagnosing, via the processor, a vehicle component failure mode based on the range corresponding to a failure condition;
   wherein the operating parameters are selected from the, group consisting of: an ignition switch position, an engine run condition, a throttle position, an engine speed, a vehicle speed, a test equipment connection, a vehicle electrical connection condition, an ambient air temperature, an engine inlet temperature, an engine lubricant pressure, an engine lubricant temperature, an engine lubricant level, an engine coolant temperature, an engine coolant specific gravity, an engine exhaust gas temperature, an engine exhaust gas content, a transmission setting, a brake pedal position, a parking brake position, a brake fluid pressure, a fuel level, a fuel supply pressure, a battery voltage, a battery charging system voltage, a battery charging system current, an ignition voltage, an ignition current, and an engine cylinder compression.

20. The computer program product of claim 19, wherein the step of defining comprises a method of automated reasoning.

21. The computer program product of claim 19, wherein the predetermined operations further comprise:
   representing each of the test data points as a point in a multidimensional vector space; and
   statistically analyzing a set of the test data points corresponding to the operating condition to define a parameter space corresponding to the operating condition in the multidimensional vector space, wherein the parameter space comprises the range.

22. The computer program product of claim 21, wherein the step of statistically analyzing further comprises mapping the failure mode to the parameter space.

23. The computer program product of claim 19, wherein the predetermined operations further comprise:
   measuring at least one of a plurality of operational parameters of a test-subject vehicle;
   comparing at least one of the measured parameters to the range; and
   determining an operating condition of the vehicle based on one or more of the compared parameters lying within the range.

24. The computer program product of claim 23, wherein the predetermined operations further comprise:
   representing each of the measured parameters as a point in a multidimensional vector space; and
   diagnosing the failure mode based on the point lying within a predefined first parameter space corresponding to the failure mode existing in one or more individual vehicles of the vehicle type, wherein the parameter space comprises the range and the step of comparing further comprises verifying whether the point lies within the parameter space.

25. A diagnostic tool for analyzing vehicle test data, comprising:
   a processor configured to execute software modules;
   a memory configured to stored the software modules, and communicatively connected to the processor;
   wherein the software modules comprise:
      a data compiler configured to compile a collection of historical test data points which includes a plurality of operating parameter measurements recorded by an individual vehicle's onboard computer, wherein the diagnostic tool and the vehicle are separate but connectable objects;
      a data analyzer configured to correlate each historical test data point with an operating condition to produce entries of a diagnostic case history, group the entries of the diagnostic case history by operating condition, and define a range corresponding to the operating condition of a vehicle type based on the collection of test data points of the entries of the diagnostic case history grouped by operating condition; and
      a virtual diagnostician configured to diagnose a vehicle component failure mode based on the range corresponding to a failure condition;
   wherein the operating parameters are selected from the group consisting of: an ignition switch position, an engine run condition, a throttle position an engine speed, a vehicle speed, a test equipment connection, a vehicle electrical connection condition, an ambient air temperature, an engine inlet temperature, an engine lubricant pressure, an engine lubricant temperature, an engine lubricant level, an engine coolant temperature, an engine coolant specific gravity, an engine exhaust gas temperature, an engine exhaust gas content, a transmission setting, a brake pedal position, a parking brake position, a brake fluid pressure, a fuel level, a fuel supply pressure, a battery voltage, a battery charging system voltage, a battery charging system current, an ignition voltage, an ignition current, and an engine cylinder compression.

26. The diagnostic tool of claim 25, wherein the data analyzer is further configured to define the range using a method of automated reasoning.

27. The diagnostic tool of claim 25, wherein the data analyzer is further configured to represent each of the test data points as a point in a multidimensional vector space and to statistically analyze a set of the test data points corresponding to the operating condition to define a parameter space corresponding to the operating condition in the multidimensional vector space, wherein the parameter space comprises the range.

28. The diagnostic tool of claim 27, wherein the data analyzer is further configured to map the failure mode to the parameter space.

29. The diagnostic tool of claim 25, further comprising:
   a parameter reader configured to measure at least one of a plurality of operational parameters of a test-subject vehicle;

a comparator configured to compare at least one of the measured parameters to the range; and a condition identifier configured to determine an operating condition of the vehicle based on one or more of the compared parameters lying within the range.

30. The diagnostic tool of claim 29, wherein the data analyzer is further configured to represent each of the measured parameters as a point in a multidimensional vector space, and the virtual diagnostician is further configured to diagnose the failure mode based on the point lying within a predefined first parameter space corresponding to the failure mode existing in one or more individual vehicles of the vehicle type, wherein the parameter space comprises the range and the step of comparing further comprises verifying whether the point lies within the parameter space.

31. A diagnostic tool for analyzing vehicle test data, comprising:

means for processing;

means for storing;

means for compiling a collection of historical test data points which includes at a plurality of operating parameter measurements recorded by an individual vehicle's onboard computer, wherein the diagnostic tool and the vehicle are separate but connectable objects;

means for correlating each historical test data point with an operating condition to produce entries of a diagnostic case history, grouping the entries of the diagnostic case history by operating condition, and defining a range corresponding to the operating condition of a vehicle type based on the collection of test data points of the entries of the diagnostic case history grouped by operating condition; and means for diagnosing a vehicle component failure mode based on the range corresponding to a failure condition;

wherein the operating parameters are selected from the group consisting of: an ignition switch position, an engine run condition, a throttle position, an engine speed, a vehicle speed, a test equipment connection, a vehicle electrical connection condition, an ambient air temperature, an engine inlet temperature, an engine lubricant pressure, an engine lubricant temperature, an engine lubricant level, an engine coolant temperature, an engine coolant specific gravity, an engine exhaust gas temperature, an engine exhaust gas content, a transmission setting, a brake pedal position, a parking brake position, a brake fluid pressure, a fuel level, a fuel supply pressure, a battery voltage, a battery charging system voltage, a battery charging system current, an ignition voltage, an ignition current, and an engine cylinder compression.

32. The diagnostic tool of claim 31, wherein the step of defining comprises a method of automated reasoning.

33. The diagnostic tool of claim 31, further comprising:

means for representing each of the test data points as a point in a multidimensional vector space; and means for statistically analyzing a set of the test data points corresponding to the operating condition to define a parameter space corresponding to the operating condition in the multidimensional vector space, wherein the parameter space comprises the range.

34. The diagnostic tool of claim 33, wherein the step of statistically analyzing further comprises mapping the failure mode to the parameter space.

35. The diagnostic tool of claim 31, further comprising:

means for measuring at least one of a plurality of operational parameters of a test-subject vehicle;

means for comparing at least one of the measured parameters to the range; and means for determining an operating condition of the vehicle based on one or more of the compared parameters lying within the range.

36. The diagnostic tool of claim 35, further comprising:

means for representing each of the measured parameters as a point in a multidimensional vector space; and means for diagnosing the failure mode based on the point lying within a predefined first parameter space corresponding to the failure mode existing in one or more individual vehicles of the vehicle type, wherein the parameter space comprises the range and the step of comparing further comprises verifying whether the point lies within the parameter space.

\* \* \* \* \*